HUBERT & PITNEY
Dress Protector for Carriage Wheels.
No. 89,315. Patented April 27, 1869.
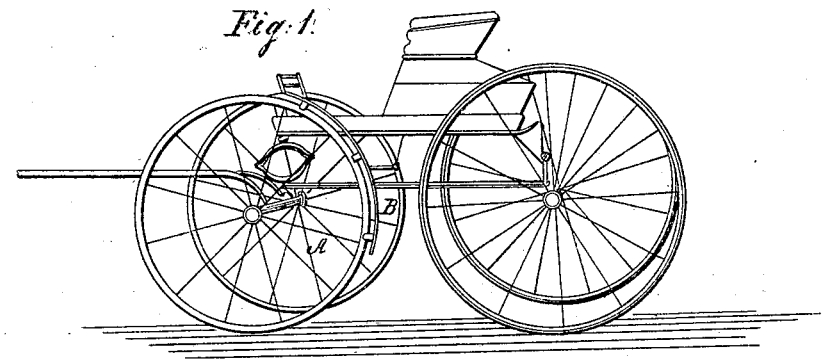
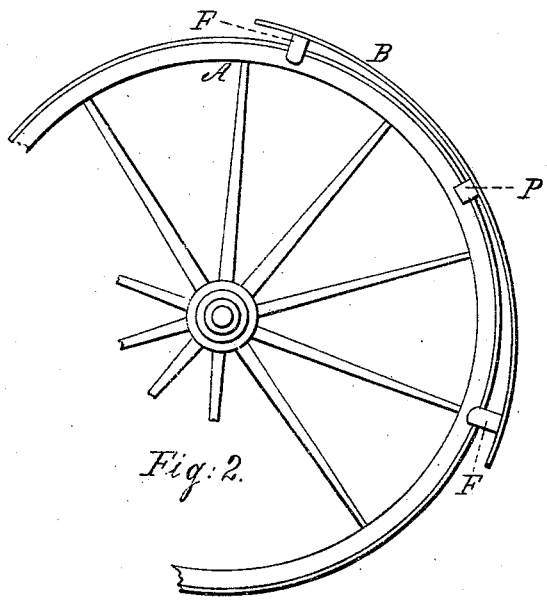
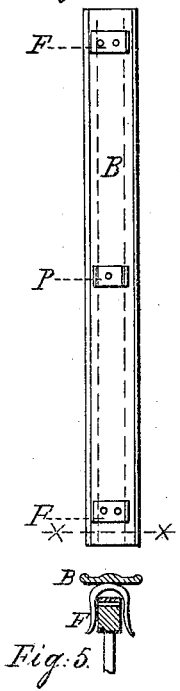
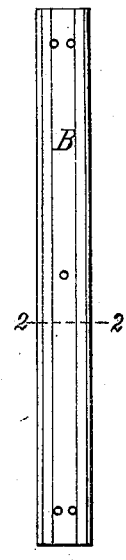
Witnesses:
H. Gengembre Hubert
Jon Bell
Inventors:
P. Gengembre Hubert
J. W. Pitney

P. GENGEMBRE HUBERT AND J. W. PITNEY, OF NEW YORK, N. Y.

Letters Patent No. 89,315, dated April 27, 1869.

IMPROVED DRESS-PROTECTOR FOR CARRIAGE-WHEELS.

The Schedule referred to in these Letters Patent and making part of the same.

*To all whom it may concern:*

Be it known that we, P. GENGEMBRE HUBERT and J. W. PITNEY, both of the city of New York, in the county of New York, and State of New York, have invented certain new and useful Improvements in Carriage Dress-Protectors; and we do hereby declare that the following is a full and exact description thereof, which will enable others skilled in the art to make and use the same, reference being had to the accompanying drawings, in which—

Figure 1 represents a carriage, with our improved dress-protector attached;

Figure 2 is part of a carriage-wheel, showing how our improved dress-protector is applied thereon;

Figure 3 represents our improved dress-protector, when removed from the wheel, and seen from the under side;

Figure 4 is a view of the same, seen from the top side;

Figure 5 is a cross-section through $xx$ of the same; and

Figure 6 is also a cross-section of the same, but through the line $zz$.

In all carriages where the position or the arrangement of the wheels renders the application of wings, or shields impracticable, it is difficult for a lady to step out of or get in said carriage without her dress coming in contact with the muddy tire of the wheel, and the damage thus done to an elegant dress has been experienced by many.

The object of our invention is to obtain an efficient and serviceable guard, or shield to prevent ladies' dresses from coming in contact with the wheels of a buggy, or other carriages, when alighting from or getting into the same.

Our dress-protector consists of a flexible shield, belt, or pad, provided with suitable springs, hooks, or catches, so as to be readily applied to the wheel, or wheels of a carriage, when the same is standing still, and, when not required for use, may be removed and stowed out of the way, as hereafter fully described.

A is a carriage-wheel.

B is the dress-protector, which may be made of any suitable material or shape. We have represented it as made of patent leather, and in shape like a simple strap, but, to suit taste and fancy, it may be made of metal, *papier-maché*, or any other material, and in shape of any elegant form dictated by taste.

The dress-protector B may be made from eighteen to thirty-six inches in length, and of suitable width to overlap on each side of the tire of the wheel, in order to effectually fence off the dress from the same.

F are springs, riveted, or otherwise fastened, to the under side of the dress-protector, at or near both its ends.

These springs have to be made so as to fit snugly on each side of the wheel, and may be lined with leather, so as not to deface the same.

P is one or more guides, having for object to keep the dress-protector in proper place over the tire of the wheel, and for that purpose are fastened thereon, between the two end-springs F.

The operation of our dress-protector is as follows:

When the carriage is stopped, and the wheels turned in proper position, the dress-protector is applied on the wheel by presenting it spring foremost to the tire of the wheel, and pressing it thereon, it will remain in the position seen in figs. 1 and 2 of our drawings, and when not required for use, it is pulled away from the wheel, and may be stowed under the seat of the carriage.

Claim.

The carriage dress-protector herein described, made so as to be applied on and be secured to the wheel, or wheels of a carriage, substantially in the manner and for the purpose set forth.

P. GENGEMBRE HUBERT. [L. S.]
J. W. PITNEY. [L. S.]

Witnesses:
H. GENGEMBRE HUBERT,
JONA. BELL.